United States Patent
Lebzelter et al.

(10) Patent No.: US 9,034,530 B2
(45) Date of Patent: May 19, 2015

(54) FUEL CELL STACK USED AS COOLANT HEATER

(75) Inventors: Derek R Lebzelter, Rochester, NY (US); Balasubramanian Lakshmanan, Pittsford, NY (US); Frederick T. Wagner, Fairport, NY (US)

(73) Assignee: GM Global Technology Operations LLC, Detroit, MI (US)

(*) Notice: Subject to any disclaimer, the term of this patent is extended or adjusted under 35 U.S.C. 154(b) by 2051 days.

(21) Appl. No.: 12/187,056

(22) Filed: Aug. 6, 2008

(65) Prior Publication Data

US 2010/0035097 A1  Feb. 11, 2010

(51) Int. Cl.
    *H01M 8/04*  (2006.01)
(52) U.S. Cl.
    CPC ...... *H01M 8/04089* (2013.01); *H01M 8/04268* (2013.01); *H01M 8/04365* (2013.01); *H01M 8/04552* (2013.01); *H01M 8/04731* (2013.01); *Y02E 60/50* (2013.01)
(58) Field of Classification Search
    USPC ........................................ 429/429
    See application file for complete search history.

(56) References Cited

U.S. PATENT DOCUMENTS

| 7,264,895 | B2 * | 9/2007 | White ............................ 429/436 |
| 7,976,997 | B2 | 7/2011 | Reiser |
| 2001/0028967 | A1 | 10/2001 | Roberts et al. |
| 2002/0076585 | A1 | 6/2002 | Mund |
| 2005/0123813 | A1 * | 6/2005 | Matoba et al. .................. 429/24 |
| 2006/0280977 | A1 | 12/2006 | Sakajo |
| 2008/0090111 | A1 | 4/2008 | Kim |

FOREIGN PATENT DOCUMENTS

DE  101 10 352 A1  9/2002

* cited by examiner

Primary Examiner — Ula C. Ruddock
Assistant Examiner — Jacob Marks
(74) Attorney, Agent, or Firm — John A. Miller; Miller IP Group, PLC

(57) ABSTRACT

A system and method for increasing the temperature of a fuel cell stack quickly, especially at cold stack start-up. The method includes determining whether the fuel cell stack is below a first predetermined temperature threshold, and, if so, starting a cooling fluid flow through the stack and engaging a shorting circuit across the stack to short circuit the stack and cause the stack to operate inefficiently. The method then determines a desired heating rate of the fuel cell stack and calculates a cathode airflow to the fuel cell stack based on the desired heating rate. The method reduces the flow of cathode air to the stack if a minimum cell voltage is below a predetermined minimum cell voltage threshold and disengages the shorting circuit and applies vehicle loads to the stack when the stack temperature reaches a predetermined second temperature threshold.

21 Claims, 2 Drawing Sheets

FUEL CELL STACK USED AS COOLANT HEATER

BACKGROUND OF THE INVENTION

1. Field of the Invention

This invention relates generally to a system and method for heating a fuel cell stack at system start-up and, more particularly, to a system and method for heating a fuel cell stack system start-up that includes electrically shorting the stack and using cathode air as a limiting reactant.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

During low temperature operation, such as below 50° C., a fuel cell stack generally operates with liquid water in the flow channels due to a low water saturation pressure. This liquid water can cause flow distribution problems, freeze start problems and electrode flooding. If the stack temperature was increased, many of these problems could be avoided. If the stack is below freezing, then ice may form in the flow channels, which needs to be quickly melted to liquid water or water vapor at system start-up so that it can be purged out of the flow channels to provide adequate flow distribution. At system shut-down, actions are taken to remove as much of the water from the stack as possible through flushing of liquid water droplets from channels and evaporate drying of the MEAs and diffusion media. However, it is generally not possible to remove as much of the water as desired from the MEAs and diffusion media, especially for low temperature starts.

It is known in the art to use the waste heat generated by a fuel cell stack to bring the system to its operating temperature, which can take a relatively long time because of the inherent efficiency of the fuel cell stack. It is also known to use a heater to heat the stack cooling fluid at system start-up so that the temperature of the stack increases more quickly. This heat put into the system is limited by the size of the cooling fluid heater and the area over which the heat transfer occurs. It is also known to inject hydrogen gas into the cathode air stream to the stack to allow for catalytic combustion of the hydrogen on the catalyst in the cathode side of the fuel cells to provide heat. However, there are limits as to the amount of hydrogen that can be sent to the cathode because of flammability and stack dry-out concerns.

SUMMARY OF THE INVENTION

In accordance with the teachings of the present invention, a system and method are disclosed for increasing the temperature of a fuel cell stack quickly, especially at cold stack start-up. The method includes determining whether the fuel cell stack is below a first predetermined temperature threshold, and, if so, starting a cooling fluid flow through the stack at normal or lower flow rates and engaging a shorting circuit across the stack, or any type of electrical load, to clamp the stack voltage close to 0V during the hydrogen fill of the anode so as to short circuit the stack and cause the stack to operate inefficiently. The method then determines a desired heating rate of the fuel cell stack and calculates a cathode airflow to the fuel cell stack based on the desired heating rate. The method reduces the flow of cathode air to the stack if a minimum cell voltage is below a predetermined minimum cell voltage threshold and disengages the shorting circuit and applies vehicle loads to the stack when the stack temperature reaches a second predetermined temperature threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for heating a fuel cell stack at cold stack start-up by shorting the terminals of the stack is merely exemplarary in nature, and is in no way intended to limit the invention or its applications or uses.

The present invention proposes a system and method for reducing the time required for a fuel cell stack to warm-up in cold temperatures to a desired minimum operating temperature. Cold system starts can be any start in which the temperature of the cooling fluid that cools the stack or the stack internal temperature on the bipolar plates or end plates is lower than the normal stack operating temperature. A predetermined cold-start temperature $T_{cold-start}$ can be defined through experimentation. If the stack is above the cold-start temperature $T_{cold-start}$, the fuel cell system will start with normal algorithms. However, if the cooling fluid temperature is below the cold-start temperature $T_{cold-start}$, then the algorithm described herein can be employed to more quickly heat the fuel cell stack so that it can provide the desired power.

Figure 1:
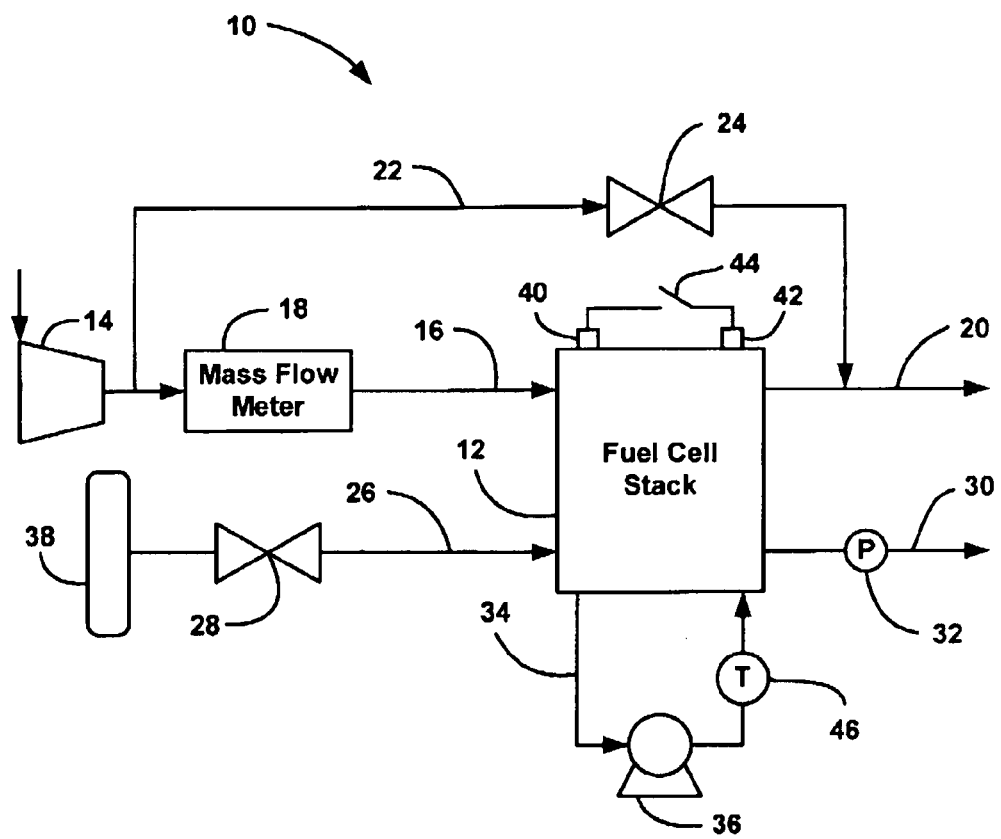
FIG. 1 is a block diagram of a fuel cell system employing a process for quickly heating a fuel cell stack, according to an embodiment of the present invention.

FIG. 1 is a block diagram of the fuel cell system 10 including a fuel cell stack 12. Cathode input air is provided by a compressor 14 and is sent to the cathode side of the fuel cell stack 12 on cathode input line 16. The flow of the cathode input air is measured by a mass flow meter 18, and the cathode exhaust gas is output from the fuel cell stack 12 on cathode exhaust gas line 20. The measured cathode airflow by the mass flow meter 18 is used to control how much of the cathode air will flow into the fuel cell stack 12 and how much of the cathode air will by-pass the fuel cell stack 12 on by-pass line 22. A by-pass valve 24 can be provided in the by-pass line 22 to selectively control the amount of cathode input air that will by-pass the stack 12 based on the mass flow measurement and be directly sent to the cathode exhaust gas line 20. The by-pass valve 24 is optional and is not necessary for proper operation of the system 10.

Hydrogen gas is provided to the anode side of the fuel cell stack 12 from a hydrogen source 38 on anode input line 26. An injector or suitable flow control valve 28 is provided in the anode input line 26 to control the amount of hydrogen gas that is received by the stack 12. Anode exhaust gas is output from the fuel cell stack 12 on anode exhaust gas line 30. The stack output pressure is kept higher than atmospheric pressure so that there is always excess hydrogen available and enable anode purge to remove nitrogen and other inert gases from the stack 12. Without excess hydrogen, the stack 12 may fuel starve, which results in damage to the electrodes in the fuel cells in the stack 12. A pressure sensor 32 provides a measurement of the anode side pressure of the fuel cell stack 12 to maintain positive driving for bleeding and provide feedback for the hydrogen feed system. Additionally, the method could use a hydrogen injector duty cycle or mass flow meter to ensure that excess hydrogen is provided to the fuel cell stack 12.

The fuel cell system 10 also includes a thermal sub-system that controls the temperature of the fuel cell stack 12 during operation of the stack 12. Particularly, the fuel cell system 10 includes a coolant loop 34 outside of the stack 12 where a cooling fluid is pumped through the coolant loop 34 by a pump 36 and cooling fluid flow channels within the stack 12. A cooling fluid temperature sensor 46 measures the temperature of the cooling fluid in the coolant loop 34 out of the stack 12. A radiator (not shown) is typically provided in the thermal sub-system to cool the cooling fluid that flows out of the stack 12. Additional temperature sensors at the coolant inlet and a coolant flow-meter can be used to improve system reliability.

The fuel cell stack 12 includes a positive terminal 40 and a negative terminal 42 from which the output power of the stack 12 is provided. According to the invention, a shorting switch 44 is provided that selectively electrically couples and disconnects the terminals 40 and 42. The switch 44 is closed to short the fuel cell stack 12 and reduce the stack voltage to at or near 0V during cold starts so that the fuel cell stack 12 operates inefficiently and generates significant heat. The shorting switch 44 has a much lower resistance than the stack's high frequency resistance so that the fuel cells will be at a limiting current. Although the shorting switch 44 is provided in this embodiment, other embodiments may employ a low ohm resistor that is switched into and out of the circuit or some type of voltage regulation device for controlling the output voltage of the stack 12 so that it is at or near 0 volts. The shorting resistor can be coupled across the stack 12 or shorting resistors coupled across each fuel cell or groups of fuel cells in the stack 12.

If the stack voltage is at or near 0 volts, and air and hydrogen are applied to the fuel cell stack 12, the stack 12 operates to generate almost all heat. When the stack 12 is in this configuration with the switch 44 closed, certain control procedures need to be taken to operate the stack 12 safely so that the distribution of air and hydrogen throughout the stack 12 is properly provided. Particularly, it is desirable that each fuel cell of the stack 12 have an adequate amount of hydrogen. By controlling the operation of the compressor 14, the amount of heat generated by the stack 12 with the switch 44 closed can be control. A small amount of hydrogen would be distributed to the flow channels in the stack 12 while the compressor speed was controlled to slightly less than the stoichiometric amount.

Figure 2:
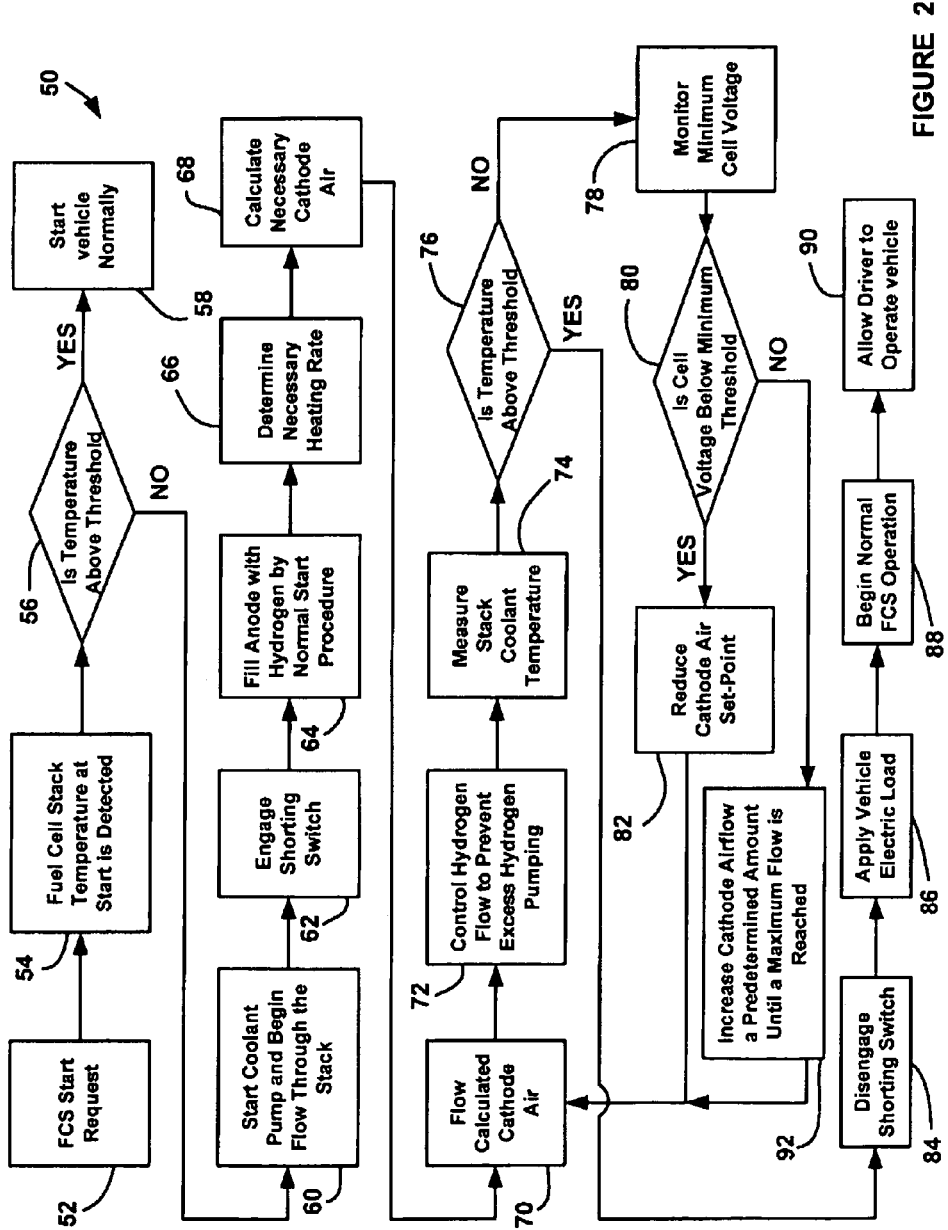
FIG. 2 is a flow chart diagram showing a process for heating the fuel cell stack shown in FIG. 1 at cold stack start-up, according to an embodiment of the present invention.

FIG. 2 is a flow chart diagram 50 showing one non-limiting process of how the fuel cell stack 12 can be quickly heated at system cold-starts, according to an embodiment of the present invention. The algorithm determines whether there is a fuel cell system start request at box 52, and if so, detects the fuel cell stack temperature at box 54 using, for example, the cooling fluid temperature sensor 46 or an internal stack temperature measurement. For example, the algorithm can determine the temperature of the fuel cell stack by measuring the temperature of the cathode airflow or anode flow stream or measuring the temperature of a bipolar plate, gas diffusion layer (GDL), MEA or end plate in the fuel cell stack 12. The algorithm determines whether the stack temperature is above the predetermined temperature threshold $T_{cold-start}$ at decision diamond 56, and if so, the algorithm starts the system normally at box 58 because the cold-start algorithm is not needed.

If the temperature of the fuel cell stack 12 is below the temperature threshold $T_{cold-start}$ at the decision diamond 56, then the algorithm starts the cooling fluid pump 36 and begins cooling fluid flow through the stack 12 at box 60. Providing a cooling fluid flow through the stack 12 during the heating process helps improve the heating uniformity eliminates any damaging hotspots within the stack 12. The algorithm also engages the shorting switch 44 at box 62 to provide a short across the terminals 40 and 42 so that the stack voltage is at or near 0V and the stack 12 operates inefficiently. When the switch 44 is closed, any reactants within the stack 12 are immediately consumed. By closing the switch 44, the stack voltage will be near 0V, which will generate the most heat. The algorithm then causes hydrogen gas to be sent to the anode side of the fuel cell stack 12 where the hydrogen gas supply is at least at stoichiometric amounts to prevent fuel starvation. The hydrogen gas flow must be limited, however, because too much hydrogen gas flow could result in excess hydrogen gas pumping from the anode to the cathode side of the stack 12.

The algorithm then determines the necessary heating rate of the stack 12 at box 66 to bring the stack 12 to the desired temperature as quickly as possible. Various factors go into determining the heating rate of the stack 12, including the thermal mass of the stack 12, the ambient temperature, etc. The algorithm will determine how much heat is necessary based on these factors to allow the vehicle driver to operate the vehicle within some predetermined minimum period of time for the current system factors. That predetermined period of time will vary depending on the factors, such as the ambient temperature and the maximum rate at which the stack 12 can be heated. The algorithm calculates the necessary cathode air at box 68 to be provided to the stack 12 to meet determined heating rate. The cathode air is metered into the cathode side of the fuel cell stack 12 at a controlled rate that is dictated by the heating requirements. Current that the stack 12 generates is based on the moles of air. The heat generated by this reaction is the maximum possible because only a small fraction of the free energy of the reaction is used to produce electric current as a result of the shorting switch 44. The rest of the energy goes directly to heat, which is taken away by the cooling fluid flowing in the coolant loop 34.

Once the proper amount of cathode air is calculated at the box 66, that amount is flowed to the fuel cell stack 12 at box 70. The hydrogen gas flow to the anode side of the stack 12 is controlled at box 72 to prevent excess hydrogen pumping. The algorithm controls the amount of hydrogen flowing to the stack 12 so that there is not excess hydrogen that could flow through the MEA's in the fuel cells to the cathode side of the stack 12. Typically, it is desirable to maintain a stoichiometric excess of hydrogen flow over air flow to the stack 12. The algorithm then measures the stack cooling fluid temperature at box 74, and determines whether the cooling fluid temperature is above a predetermined temperature threshold, which can be higher than the cold start temperature $T_{cold\text{-}start}$.

If the temperature of the cooling fluid is not above the predetermined threshold at the decision diamond 76, then the algorithm determines the minimum cell voltage at box 78, and determines whether the minimum cell voltage is below a minimum cell voltage threshold at decision diamond 80. By monitoring the minimum cell voltage as the stack 12 is being heated, fuel cells in the stack 12 can be prevented from being damaged as a result of the heating process if they tend to reverse their electrical potential. If the minimum cell voltage is below the minimum threshold at the decision diamond 80, then the algorithm reduces the cathode air set-point at box 82, and then returns to the box 70 to provide the new cathode flow rate to the stack 12. If the minimum cell voltage is not below the minimum threshold at the decision diamond 80, then the algorithm increases the cathode airflow a predetermined amount at box 92 until a maximum flow is reached. The newly calculated cathode airflow is then sent to the cathode side of the stack at the box 70.

If the stack temperature is above the threshold at the decision diamond 76, then the stack 12 is heated properly, and the shorting switch 44 is disengaged at box 84. The electrical vehicle loads are then applied at box 86 and the fuel cell system 10 begins normal operation at box 88. The driver is then allowed to operate the vehicle at box 90.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for heating a fuel cell stack at stack start-up, said method comprising:
   determining whether the temperature of the fuel cell stack is below a first predetermined temperature threshold;
   starting a cooling fluid flow through the stack if the stack temperature is below the first predetermined temperature threshold;
   engaging a shorting circuit across the stack to short circuit the stack and cause the stack to operate inefficiently;
   determining a desired heating rate of the fuel cell stack;
   calculating a cathode airflow to the fuel cell stack based on the desired heating rate;
   flowing the calculated cathode air to the cathode side of the fuel cell stack;
   measuring the temperature of the stack to determine whether the temperature is above a second predetermined temperature threshold;
   determining a minimum cell voltage if the temperature of the stack is below the second temperature threshold;
   reducing a flow of cathode air to the stack if the minimum cell voltage is below a predetermined minimum cell voltage threshold; and
   disengaging the shorting circuit and applying vehicle loads to the stack if the temperature of the stack is above the second temperature threshold.

2. The method according to claim 1 wherein the second temperature threshold is higher than the first temperature threshold.

3. The method according to claim 1 wherein determining and measuring the temperature of the fuel cell stack includes measuring the temperature of the cooling fluid.

4. The method according to claim 1 wherein determining and measuring the temperature of the fuel cell stack includes measuring the temperature of the cathode airflow or anode flow stream.

5. The method according to claim 1 wherein determining and measuring the temperature of the fuel cell stack includes measuring the temperature of a bipolar plate, gas diffusion layer, MEA or end plate in the fuel cell stack.

6. The method according to claim 1 wherein engaging the shorting circuit includes closing a switch that provides an electrical short across the stack.

7. The method according to claim 1 wherein engaging the shorting circuit includes coupling a resistor across the stack.

8. The method according to claim 1 wherein engaging the shorting circuit includes coupling resistors across each fuel cell or groups of fuel cells in the stack.

9. The method according to claim 1 further comprising filling the anode side of the stack with hydrogen after the shorting circuit is engaged and controlling the flow of hydrogen to prevent hydrogen pumping.

10. The method according to claim 1 further comprising increasing the cathode airflow to the stack if the minimum cell voltage is not below the minimum cell voltage threshold.

11. The method according to claim 1 wherein determining the desired heating rate includes determining the desired heating rate based on ambient temperature and stack factors including the stack thermal mass.

12. A method for heating a fuel cell stack at stack start-up, said method comprising:
    determining whether the temperature of the fuel cell stack is below a first predetermined temperature threshold;
    engaging a shorting circuit across the stack to short circuit the stack and cause the stack to operate inefficiently;
    determining a desired heating rate of the fuel cell stack;
    calculating a cathode airflow to the fuel cell stack based on the desired heating rate; and
    flowing a calculated cathode air to the cathode side of the fuel cell stack.

13. The method according to claim 12 further comprising starting a cooling fluid flow through the stack if the stack is below the first predetermined temperature threshold.

14. The method according to claim 12 further comprising determining a minimum cell voltage if the temperature of the stack is below a second temperature threshold and reducing the flow of cathode air to the stack if the minimum cell voltage is below a predetermined minimum cell voltage threshold.

15. The method according to claim 14 further comprising increasing the cathode airflow to the stack if the minimum cell voltage is not below the minimum cell voltage threshold.

16. The method according to claim 12 wherein determining the temperature of the fuel cell stack includes measuring the temperature of a stack cooling fluid.

17. The method according to claim 12 wherein engaging a shorting circuit includes closing a switch that provides an electrical short across the stack.

18. The method according to claim 12 further comprising filling the anode side of the stack with hydrogen after the shorting circuit is engaged and controlling the flow of hydrogen to prevent hydrogen pumping.

19. The method according to claim 12 wherein determining the desired heating rate includes determining the desired heating rate based on ambient temperature and stack factors including the stack thermal mass.

20. A method for heating a fuel cell stack, said method comprising:
    determining whether the temperature of the fuel cell stack is below a first predetermined temperature threshold;
    engaging a shorting circuit across the stack to short circuit the stack and cause the stack to operate inefficiently if the temperature of the fuel cell stack is below the first predetermined temperature threshold; and
    determining a desired heating rate of the fuel cell stack, calculating a cathode airflow to the fuel cell stack based on the desired heating rate, and flowing a calculated cathode air to the cathode side of the fuel cell stack if the temperature of the fuel cell stack is below the first predetermined temperature threshold.

21. The method according to claim 20 further comprising determining a minimum cell voltage if the temperature of the stack is below a second predetermined temperature threshold and reducing the flow of cathode air to the stack if the minimum cell voltage is below a predetermined minimum cell voltage threshold.

* * * * *